US009272333B2

United States Patent
Tanaka et al.

(10) Patent No.: US 9,272,333 B2
(45) Date of Patent: Mar. 1, 2016

(54) METHOD OF MAKING A POROUS SINTERED BODY, A COMPOUND FOR MAKING THE POROUS SINTERED BODY, AND THE POROUS SINTERED BODY

(75) Inventors: Shigeo Tanaka, Osaka (JP); Shinji Ishida, Osaka (JP); Kazuaki Nishiyabu, Nara (JP)

(73) Assignee: TAISEI KOGYO CO., LTD., Neyagawa-shi (JP)

( * ) Notice: Subject to any disclaimer, the term of this patent is extended or adjusted under 35 U.S.C. 154(b) by 2565 days.

(21) Appl. No.: 11/665,017

(22) PCT Filed: Oct. 13, 2005

(86) PCT No.: PCT/JP2005/018850
§ 371 (c)(1),
(2), (4) Date: Sep. 11, 2008

(87) PCT Pub. No.: WO2006/041118
PCT Pub. Date: Apr. 20, 2006

(65) Prior Publication Data
US 2009/0202821 A1  Aug. 13, 2009

(30) Foreign Application Priority Data
Oct. 15, 2004 (JP) .................. 2004-301482

(51) Int. Cl.
*B22F 3/11* (2006.01)
*B22F 3/10* (2006.01)
*B22F 7/00* (2006.01)
*C04B 38/02* (2006.01)
*C04B 38/04* (2006.01)
*C04B 111/00* (2006.01)

(52) U.S. Cl.
CPC ............ *B22F 3/1121* (2013.01); *B22F 3/1021* (2013.01); *C04B 38/02* (2013.01); *C04B 38/04* (2013.01); *B22F 2998/10* (2013.01); *C04B 2111/0081* (2013.01); *C04B 2111/00793* (2013.01); *C04B 2111/00844* (2013.01); *Y10T 428/268* (2015.01)

(58) Field of Classification Search
None
See application file for complete search history.

(56) References Cited

U.S. PATENT DOCUMENTS 5,432,224 A * 7/1995 Ryuhgoh et al. ............... 524/439

FOREIGN PATENT DOCUMENTS

| JP | 1-164755 A | 6/1989 |
| JP | 04-59655 A | 2/1992 |
| JP | 2001-240480 A | 9/2001 |
| JP | 2003-129109 A | 5/2003 |

OTHER PUBLICATIONS

International Search Report of PCT/JP2005/018850, date of mailing Mar. 7, 2006.

* cited by examiner

*Primary Examiner* — Yoshitoshi Takeuchi
(74) *Attorney, Agent, or Firm* — Westerman, Hattori, Daniels & Adrian, LLP

(57) ABSTRACT

A method of making a porous sintered body includes a formation step S102 where a sintering compound which contains a binder and a sinterable powder material is into a predetermined shape; a degreasing steps S103, S104 and S105 where the binder is removed from a formed body obtained in the formation step; and a sintering step S108 where a degreased body after the degreasing step is sintered into a sintered body. The binder contains a component which drains at a temperature higher than a draining temperature of the pore formation material drains. The pore formation material is drained in the degreasing step, with part of the binder remaining un-drained. The present invention enables to manufacture porous sintered bodies which are highly porous, and highly accurate in shape and dimensions. The present invention also enables to manufacture porous sintered bodies which offer functionalities not available before.

13 Claims, 8 Drawing Sheets

METHOD OF MAKING A POROUS SINTERED BODY, A COMPOUND FOR MAKING THE POROUS SINTERED BODY, AND THE POROUS SINTERED BODY

TECHNICAL FIELD

The present invention relates to methods of making porous sintered bodies, compounds for forming porous sintered bodies, and porous sintered bodies. Specifically, the present invention relates to methods and related techniques for accurately forming porous sintered bodies which have a high rate of porosity.

BACKGROUND ART

Numerous products are manufactured from a porous sintered body i.e. a material that has a multiple of voids within. These products include filters, catalysts for chemical reactions, electrodes, heat exchangers and so on. When the pores are used to hold lubricant oil or the like, the porous sintered body can be used as a material for bearings.

Methods of manufacturing the porous sintered body include casting method, foaming method, plating method, etc. Another method is space holder method: In this method, powdery sintering compound is mixed with a pore formation material which is a compound that is removed by heat. The mixed compound is molded, then heated to remove the pore formation material thereby making pores, and thereafter the sintering compound is sintered into a porous sintered body.

JP-A 2001-2271101 Gazette for example, discloses a method of making a sintered body by using space holder method.

The patent document discloses a method of making a sintered body which uses a composite including a row material powder, an organic binder, and a pore formation material whose decomposition starting temperature is higher than that of the organic binder. The method includes a step of forming a formed body, a first degreasing step of removing the organic binder thereby obtaining a first degreased body, a second degreasing step of removing the pore formation material thereby obtaining a second degreased body, and a step of sintering the second degreased body thereby obtaining a sintered body.

In the Patent Document 1, it is described that according to the invention therein, it is possible to secure a path for removal of the pore formation material, by prior removal of the organic binder.

According to the method of making a sintered body disclosed in the Patent Document, first, most of the binder is removed in the first degreasing step. Next, the first degreased body is heated further, thereby removing the pore formation material. Thus, at the time when the pore formation material has been removed, there is no binder remaining.

However, the pore formation material generally has a larger particle size than the binder and the sintering compound particles. On the other hand, in a formed body before the degreasing process, the sintering compound particles and the binder are loaded to fill the surrounds of the pore formation material. Thus, in the invention disclosed in the Patent Document, the sintering compound particles after removal of the binder are supported by the pore formation material, around the pore formation material. Then, as the pore formation material is removed under this state, the sintering compound particles around the pore formation material are likely to drop into the space formerly occupied by the pore formation material, or walls that define pores are likely to deform.

As a result, the formed body is easily deformed in the degreasing step, and it is difficult to obtain a sintered body of a desired size and shape.

In particular, when making a porous body which has a high rate of porosity, walls provided by the sintering compound particles around the pores tend to be thin, and are likely to deform for example, in the degreasing step, making it difficult to form pores of a desired shape and size, and thus making impossible to obtain a sintered body of a desired porosity. As a result, according to the Patent Document, it is impossible to form a porous sintered body which has a porosity not smaller than 50%.

Currently, porous sintered bodies which offer novel functions are available. These are made from a compound mixed with a functional particle material which works as a catalyst for example. The functional material mixed with the sintering compound is molded and sintered into products. However, according to such a sintered body produced by sintering a sintering compound mixed with a functional particle material, only part of the functional particle material can be on a surface, and have exposure to the pore space. Thus, it has not been possible to make the product as effective as the amount of functional material particles mixed with the compound. Therefore, if the product is to be effective in terms of functionality provided by the functional particle materials mixed therein, a large amount of the functional particle must be added, which makes it impossible to use expensive material such as platinum.

One idea is to form a porous sintered body first and then fill the pores with a functional material. A problem, however, is that only a limited amount of functional material can be filled in the sintered body if the body has a small porosity. Another problem is that functional material in the form of particle is difficult to fill after the body has been sintered and the amount which can be filled is also limited unless the pores are large. It may not be impossible to form pores first, and then fill the material before sintering; however, the conventional porous formed body as disclosed in the Patent Document does not have enough strength after the pores are formed, so filling is an impossible idea.

DISCLOSURE OF THE INVENTION

The present invention was made in order to solve the above-described problems. The present invention provides methods for solving the above-described problems in the degreasing step, enabling to manufacture highly accurate porous sintered bodies and to manufacture porous sintered bodies with functionalities which have not been available before.

An invention disclosed in claim 1 of the present application relates to a method of making a porous sintered body, including: a pellet making step of making a compound pellet by heating and mixing a sintering compound containing a binder, a sinterable powder material and a pore formation material at a temperature causing the binder to melt but not causing the pore formation material to soften; a thermal formation step of forming the pellet made in the _pellet making step into a predetermined shape at a temperature causing the binder to melt but not causing the pore formation material to deform; a degreasing step of removing the binder from a formed body obtained from the thermal formation step; and a sintering step of sintering a degreased body after the degreasing step. With the above, the binder contains a component which melts at a temperature attained in the pellet making step and the formation step and drains at a temperature higher than a temperature at which the pore formation material drains, and the pore formation material is drained in the degreasing step, with part of the binder remaining un-drained.

According to the present invention, first, a pellet making step is performed for forming pellets applicable to thermal formation process such as injection molding, thermal protrusion, etc. In the pellet making step, mixing is performed at temperatures which allow the binder to melt but do not allow the pore formation material to soften, so as to ensure ease of formation in the step thereafter. When heated, the pellets gain increased fluidity, enabling the thermal forming step to be performed in such conventional ways as injection molding. The thermal formation step is performed also at temperatures which allows the binder to melt but do not allow the pore formation material to change its shape. In the degreasing step according to the present invention, the pore formation material is drained while part of the binder remains. Since the pore formation material is to drain first, the binder contains components which melt at temperatures in the pellet making step and the formation step, and drains at temperatures higher than a draining temperature of the pore formation material. It should be noted here that the binder in the present invention includes any components other than the sintering compound and the pore formation material, contained in the formed body after the formation and capable of providing shape retentionability during the degreasing step. When the pore formation material drains, the remaining binder binds the sintering compound around the pore formation material, thereby enhancing shape retentionability. On the other hand, not all amount of the binder component is kept until the pore formation material has drained, but an amount of the binder necessary for providing gaps for the pore formation material to drain is drained before the pore formation material. This eliminates collapsing of sintering compound particles around the pore formation material during the degreasing step, making possible to form pores of highly precise shape and dimensions. Further, letting part of the binder remain un-drained increases strength of the formed body after the pore formation, making possible to perform intermediate processing such as filling the pores with functional particles described earlier.

There is no specific limitation to the kind of sintering compound in the present invention. Metal powder, ceramic powder, or a mixture of these may be used as a sintering powder material. There is no specific limitation, either, to the particle size of the powder.

There is no specific limitation, either, to the amount of the binder to remain un-drained. The amount may be selected in accordance with such factors as the particle size of the pore formation material and the sintering compound, as well as an intermediate work processes to be performed after pores are formed. If injection molding is employed, the mixing ratio of the binder to the overall amount of the injection compound should preferably selected from a range of 8 volume percent through 40 volume percent. A rate lower than 8 volume percent decreases flow in the mold, which leads to decreased accuracy of the formed body. On the other hand, a rate exceeding 40 volume percent will cause excessive shrinkage and deformation of the formed body during the degreasing process.

The amount of binder which remains un-drained should preferably be an amount sufficient to maintain the strength of the formed body during the draining process of the pore formation material. In other words, it is preferable that a sufficient level of the remaining binder should be maintained for preventing the formed body from deformation during the time when the pore formation material is drained in the degreasing step. There is no specific limitation to the mode of draining the pore formation material: The drainage mode may include burning, decomposition, vaporization, etc.

On the other hand, it is preferable that a certain amount of the binder has drained by the time when the pore formation material begins to drain, so as to provide paths or gaps for the pore formation material to drain. Further, it is preferable that the formation of the drain paths is matched to such specifics as speed and amount of drainage of the pore formation material. If an intermediate processing is to be made after pores are formed, it is preferable that an appropriate amount of the binder should remain un-drained when the pore formation material has drained, so as to maintain a level of strength to allow the intermediate processing.

An invention disclosed in claim 2 of the present application provides a method where the binder contains: a low-temperature draining component which begins to drain at a temperature lower than a draining temperature of the pore formation material, and drains at a degreasing temperature that is lower than the draining temperature of the pore formation material; and a high-temperature draining component which begins to drain at a temperature higher than a drain-starting temperature of the pore formation material, and drains at a degreasing temperature that is higher than the draining temperature of the pore formation material. With the above, the degreasing step includes: a first degreasing step where the low-temperature draining component is allowed to begin draining and before the pore formation material is allowed to begin draining; a second degreasing step where the pore formation material is allowed to drain completely; and a third degreasing step where the high-temperature draining component is allowed to drain completely.

According to the present invention, the low-temperature d draining component begins to drain first. This creates gaps for the pore formation material to drain through. There is no need for the low-temperature draining component to have drained entirely before the pore formation material begins to drain, as long as the gaps provide sufficient drainage channel for changing amounts of the pore formation material along the time course. Next, the temperature is increased to drain the pore formation material. Until the pore formation material has completely drained, part or all of the high-temperature draining component stays within, to increase shape retentionability during the time when the pore formation material drains. In order to maintain the shape retentionability, it is preferable that an amount of the binder specific to such factors as the shape should remain after the pore formation material has drained completely.

An invention disclosed in claim 3 of the present application provides a method where the pore formation material is allowed to drain through gaps formed by drainage of the low-temperature draining component or gaps formed by partial drainage of the high-temperature draining component, in the second degreasing step.

The low-temperature draining component and the high-temperature draining component can be selected on the basis of the draining temperature of the pore formation material. The low-temperature draining component should be selected from materials which begin draining before the pore formation material begins to drain. On the other hand, the high-temperature draining component should be selected from materials which remain un-drained at least partially even after the pore formation material has drained completely. For example, the low-temperature draining component and the high-temperature draining component may be selected on the basis of their decomposition starting temperature and decomposition completing temperature. It is a characteristic of the present invention that the binder remains un-drained upon complete drainage of the pore formation material, so as to increase shape retentionability; therefore, material selection is not made only on conventional sense of decomposition starting temperature and decomposition completing temperature.

An invention disclosed in claim 4 of the present application provides a method where the binder component is drained by 0.1 volume percent through 5.0 volume percent before the pore formation material begins draining.

In order to secure paths for the pore formation material to drain, a certain level of drainage paths must be ready by the time when the pore formation material begins to drain. While the amount of the binder for forming the drainage paths depends on e.g. the size of the pore formation material and the sintering particles, it is preferable that the amount should not be smaller than 0.1 volume percent of the entire amount of the binder. A lower rate will not provide enough paths at an initial stage of drainage of the pore formation material, which can lead to increased pressure on the sintering compound after the pore formation material has begun draining, resulting in deformation for example. On the other hand, a rate exceeding 5.0 volume percent is likely to decrease shape maintaining strength for the sintering compound around the pore formation material. While there is no specific limitation to the degreasing temperature during this process, maintaining a degreasing temperature which allows the binder to drain but does not allow the pore formation material to drain, for a necessary amount of time will ensure that the necessary amount of the binder will drain.

An invention disclosed in claim 5 of the present application provides a method where the binder component remains un-drained by 5 volume percent through 40 volume percent upon complete drainage of the pore formation material.

In order to ensure a level of strength in pore walls, it is preferable that no less than 5 volume percent of the binder remains un-drained when the pore formation material has drained completely. A rate smaller than 5 volume percent increases a risk of deformation for example, in the formed body during or after the drainage of the pore formation material. On the other hand, a rate exceeding 40 volume percent can inhibit drainage of the pore formation material and stress the formed body in the draining process. In addition, such a rate increases degreasing time after the pore formation material has drained.

It should be noted here that there is no need for all of a specific binder component to remain un-drained: Rather, the binder should drain as the pore formation material drains, with part of the binder remaining un-drained when the pore formation material has drained completely.

An invention disclosed in claim 6 of the present application provides a method where the high-temperature draining component contains at least two binder components each having a draining temperature differing from the other, and the binder components having different draining temperatures are drained sequentially in the third degreasing step.

With increased porosity, there is an increasing need for a corresponding amount of the binder to remain un-drained after the pore formation material has drained, so as to maintain shape retentionability while the pore formation material drains. On the other hand, after the pore formation material has drained, the shape of the formed body is maintained only by a thin, wall-like structure between the pores. Therefore, the formed body can deform easily if the remaining binder in the sintering compound is drained too quickly. The present invention solves this problem.

At least two or more binders each having a draining temperature differing from the others are drained sequentially after the pore formation material has been drained. This enables to drain the remaining binder smoothly without causing excessive stress on the formed body. With this invention, it has become possible to make porous sintered bodies which have a very high porosity in a range of 50% through 80%.

An invention disclosed in claim 7 of the present application includes an interim work step of subjecting an intermediary degreased body which has undergone the second degreasing step to intermediate processing.

According to the present invention, the porous formed body after the second degreasing step contains the binder within, and therefore, it is possible to maintain a level of strength required in the intermediate process. Thus, it is now possible to perform various intermediate processes to the formed body which is now porous. On the assumption that the intermediate process will be made, it is preferable that an amount of the binder which is to remain un-drained should be determined in accordance with the type of process expected, in order to provide sufficient strength for the processing. There is no specific limitation to the kind of the intermediate processing, and so a variety of machining may be performed including cutting/grinding, and plasticity processing as well as other types of machining.

Conventionally, porous bodies after the pore formation material has been drained do not have a high level of strength, and it is difficult to perform an intermediate process to the porous body. For this reason, a degreasing step is followed successively by a sintering step. According to the present invention, a necessary amount of the binder remains in the body after the pore formation material has been drained. Therefore, it is now possible to perform intermediate processes just the same way as the formed body can be machined before degreasing. The present invention has become possible as a result of increased shape maintaining strength in the degreased body.

As in an invention disclosed in claim 8, the method of making a porous sintered body having continuous pores may further include an additional-material filling step of filling a predetermined additional material to part or all of the pores in an intermediary degreased body which has undergone the second degreasing step.

Porous sintered bodies having their pores filled with a variety of functional materials are available conventionally. However, because of low strength in the degreased body, many are manufactured by sintering first and then filling the functional material thereafter. Thus, there are limitations to the kind and state of the functional material to be filled. Further, additional steps such as a secondary sintering step are necessary in order to integrate the functional material with the sintered body.

According to the present invention, part of the binder remains un-drained under a state where the pore formation material has been drained. Therefore, the porous body has a high level of strength, making it possible to load the pores with a variety of materials before the sintering step.

An invention disclosed in claim 9 of the present application provides a method where the third degreasing step and the sintering step are performed after the additional-material filling step disclosed in claim 8, and the additional material is sintered integrally with the sintering compound in an inner surface of the pores.

The present invention enables to sinter the additional material and the sintered body integrally with each other only in one sintering step.

An invention disclosed in claim 10 of the present application provides a method where the third degreasing step and the sintering step are performed after the additional-material filling step, and the additional material is held movably in the pores.

Normally, a sintering step causes a degreased body to shrink. Therefore, the size of the pores decreases with the shrinkage. The present invention capitalizes on the shrinkage in such a way that a non-sinterable additional material is captured movably in the pores. For example, particles of e.g. a functional ceramic which does not sinter at a sintering temperature of a metal may be movably held in pores in a porous body made of the metal for maximum performance of the functional ceramic via the pore.

An invention disclosed in claim 11 of the present application provides a method where the pore formation material is mixed at a ratio of 50 through 80 volume percent of the sintering compound.

By mixing the pore formation material at a ratio selected between 50% through 80%, it becomes possible to produce porous sintered bodies which have approximately the same porosity. According to conventional methods, even if a large amount of pore formation material is used, it is not possible to maintain the shape of pores in the degreasing step. As a result, it is impossible to form porous bodies which have a porosity similar to the rate of pore formation material used. It is particularly difficult to manufacture porous sintered bodies which have a porosity not smaller than 50%. According to the present invention, as a result of increased shape retentionability in the degreasing step, it is possible to form porous sintered bodies which have a very high porosity of 50 through 80%.

It should be noted here that a maximum fill rate achievable is about 74% when a spherical pore formation material is filled to a maximum density. However, by performing the formation step under a pressure thereby deforming the pore formation material, the porosity can be increased to 80%. Porosity can also be increased by using a pore formation material which includes particles of different sizes.

Formed bodies according to the present invention may be formed by a variety of methods, which include thermal press formation, thermal protrusion formation, etc. Also, as disclosed in an invention in claim 12, the formation step may employ an injection molding process.

An invention disclosed in another embodiment of the of the present application provides a sintering compound containing a binder, a sinterable powder material and a pore formation material, for formation into a predetermined shape in a thermal formation step, removal of the binder in a degreasing step, and sintering of the powder material in a sintering step. The binder contains: a low-temperature draining component which melts in the thermal formation step, begins draining at a temperature lower than a draining temperature of the pore formation material, and drains at a temperature lower than a temperature at which the pore formation material drains; and a high-temperature draining component which melts in the thermal formation step, begins draining after the pore formation material has begun draining, and drains at a temperature higher than does the pore formation material.

An invention disclosed in another embodiment of the present application provides a sintering compound where the binder contains the low-temperature draining component at a rate of 40 volume percent through 70 volume percent.

The low-temperature draining component and the high-temperature draining component may be selected in accordance with the draining temperature of the pore formation material employed. There is no specific limitation to the mode of drainage; the mode may include burning, decomposition, vaporization, etc.

If the ratio of the low-temperature draining component is smaller than 40 percent, it is impossible to ensure draining paths for the pore formation material. On the other hand, if the ratio of the low-temperature draining component is greater than 70 volume percent, it is impossible to retain sufficient shape retention strength during the draining process of the pore formation material.

It should be noted here that neither the low-temperature draining component nor the high-temperature draining component needs to be a single component. In other words, the low-temperature draining component includes all constituent components which drain completely in the degreasing step before the pore formation material has drained. On the other hand, the high-temperature draining component includes all constituent components which are remaining at least partially when the pore formation material has drained, and complete draining thereafter.

An invention disclosed in another embodiment of the present application provides a sintering compound where the high-temperature draining component contains at least two binder components each draining at a draining temperature differing from that of the others, after the pore formation material has drained.

Porous formed bodies which have a higher porosity become lower in shape retention strength after the pore formation material drains. Therefore, quick draining of the remaining binder increases a risk of deformation for example. The present invention enables to drain remaining binder without posing excessive stress after the pore formation material has been drained.

An invention disclosed in another embodiment of the present application relates to a porous sintered body forming compound containing the pore formation material at a rate of 50 through 80 volume percent of the sintering compound.

An invention disclosed in another embodiment of the present application provides a porous sintered body wherein at least part of its pores hold, by shrinkage during a sintering step, a powder material not sinterable at a sintering temperature during a sintering process of the sintered body.

An invention disclosed in another embodiment of the present application relates to a porous sintered body in which the powder material is held movably within the pores.

BEST MODE FOR CARRYING OUT THE INVENTION

Figure 1:
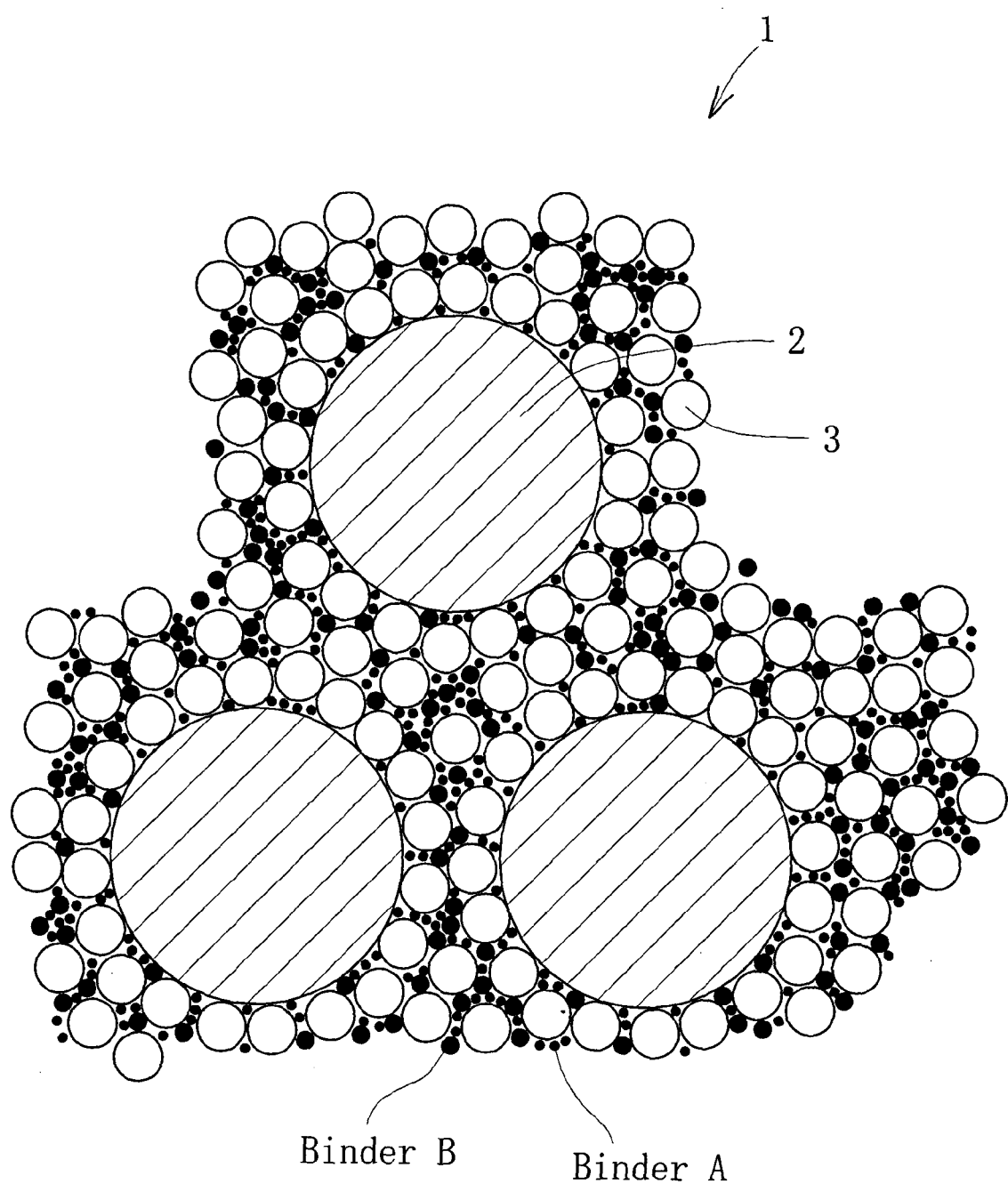
FIG. 1 is a conceptual diagram showing a cross sectional structure of a formed body according to an embodiment.

Hereinafter, description will cover embodiments which are application examples of the methods of making porous sintered bodies according to the present invention to metal powder injection molding.

TABLE 1

| Composition | Component | Particle Size | Mixing Ratio to All (Vol %) | | Binder Component Ratio (Vol %) | Drain Starting Temp. (° C.) | Drain Temp. (° C.) |
|---|---|---|---|---|---|---|---|
| Pore Formation Material | PMMA | 50 μm | 60 | 100 | | 240 | 400 |
| Metal Powder | SUS316L | 10 μm | 20 | | | | |
| Binder A (Low-temp.) | Wax | | 12.8 | | 64 | 210 | 340 |
| Binder B (High-temp.) | POM | | 2.1 | | 10.5 | 352 | 488 |
| | PP | | 5.1 | | 25.5 | 255 | 497 |

In the present embodiment example, materials and conditions as shown in Table 1 are used: Metal powder is provided by SUS 316L which has an average particle size of 10 μm; pore formation material is provided by PMMA (polymethylmethacrylate resin) which has an average particle size of 50 μm. In addition, binders are provided by three kinds of binder components; i.e. wax (a compound wax made of natural wax and synthetic was), POM (polyacetal) and PP (polypropylene). These components are mixed uniformly at a ratio shown in Table 1 to make an injection compound.

There is no specific limitation to the kind of metal powder to be used as the sintering compound. Other metal powders, ceramic powders or a mixture of a plurality of materials selected from these may be used as long as they are sinterable.

There is no specific limitation to an average particle size of the metal powder. So called submicron particles which have a particle size of not greater than 1 μm may be used, or large powder particles of about 100 μm may also be used. Preferably however, the particle size should be selected from a range of 1 μm through 30 μm for the sake of increased sintering performance. It should be noted here that when manufacturing a sintered body which has a porosity not smaller than 50%, the metal powder should preferably have an average particle size smaller than that of the pore formation material.

The amount of metal powder to be mixed, which varies depending on the porosity targeted, should preferably be selected from a range of 15 through 30 volume percent of the total compound mix. If the amount is smaller than 15 volume percent, the amount of binder is relatively large, leading to increased shrinkage or deformation in the degreasing step and sintering step. On the other hand, the amount exceeding 30 volume percent reduces fluidity, leading to poor operability.

In the present example, the pore formation material is provided by PMMA particles having an average particle size of 50 μm. The PMMA particles have a draining-start temperature of 240° C. On the other hand, their draining temperature at which they are removed completely from the formed body is 400° C. In the present example, the draining-start temperature is a decomposition starting temperature of the relevant component. The pore formation material does not soften or melt in the mixing step or injection molding step. Further, in the present example, the pore formation material is granular, having a spherical particle shape; however, the pore formation material may be of other types such as fibriform, baculiform, and so on.

In the present example, two kinds of binders are used: Binder A is a component which has a draining temperature lower than that of the pore formation material, and Binder B which has draining temperature higher than that of the pore formation material.

The binder A is a wax component: Its draining-start temperature is 210° C. approximately whereas its draining temperature is 340° C.

The binder B contains POM (polyacetal) and PP (polypropylene). The POM has a draining-start temperature of 352° C. and a draining temperature of 488° C. The PP, on the other hand, has a draining-start temperature of 255° C., and a draining temperature of 497° C. The draining temperatures assume that the degreasing step is performed at a temperature rising rate of 20° C./hour.

As is clear from these draining-start temperatures, the binder A starts draining at a draining-start temperature lower than that of the pore formation material. On the other hand, the binder B has a draining-start temperature higher than that of the pore formation material. In the present example, removal of the binder and removal of the pore formation material are defined by decomposition starting temperature and decomposition completing temperature. It must be understood, however, that a characteristic of the present invention is to keep part of the binder un-drained at the end of draining of the pore formation material. If the binder drains in a different mode, the definition criterion should preferably be a temperature or a period of time for the binder to complete draining actually.

The compound of the above-described component composition is mixed at a temperature (200° C. approx.) which is low enough not to cause softening of the pore formation material made into the form of pellet. Then, the compound is molded into a predetermined shape using an injector. The injection molding step is performed also at a temperature low enough not to deform the shape of the pore formation material.

After the injection molding, the formed body 1 has a structure as shown in a conceptual image given in FIG. 1. As shown in FIG. 1, large particles of the pore formation material 2 are surrounded by a mixture of metal powder 3, the binder A and the binder B, and distribution is substantially uniform. For easier understanding, FIG. 1 illustrates the binders A, B in the form of particle; however, the binders A and B melt during the molding step, and distribute to fill spaces between the particles. Of the binders, small black circles represent the binder A while large black circles represent the binder B.

Next, a degreasing step is performed. Hereinafter, reference will be made to FIG. 2 through FIG. 4, and FIG. 6 along with the description.

In the present example, temperature in the degreasing furnace is raised at a rate of 20° C./hour. As the temperature in the furnace reaches and goes beyond 210° C., the binder A begins draining. This is a first degreasing step S103 which continues until the pore formation material begins draining. In the first degreasing step S103, predetermined gaps are formed between the metal particles by the time when the pore formation material 2 begins to drain. In the present example, approximately 2 volume percent of the binder A drains in the first degreasing step.

Figure 2:
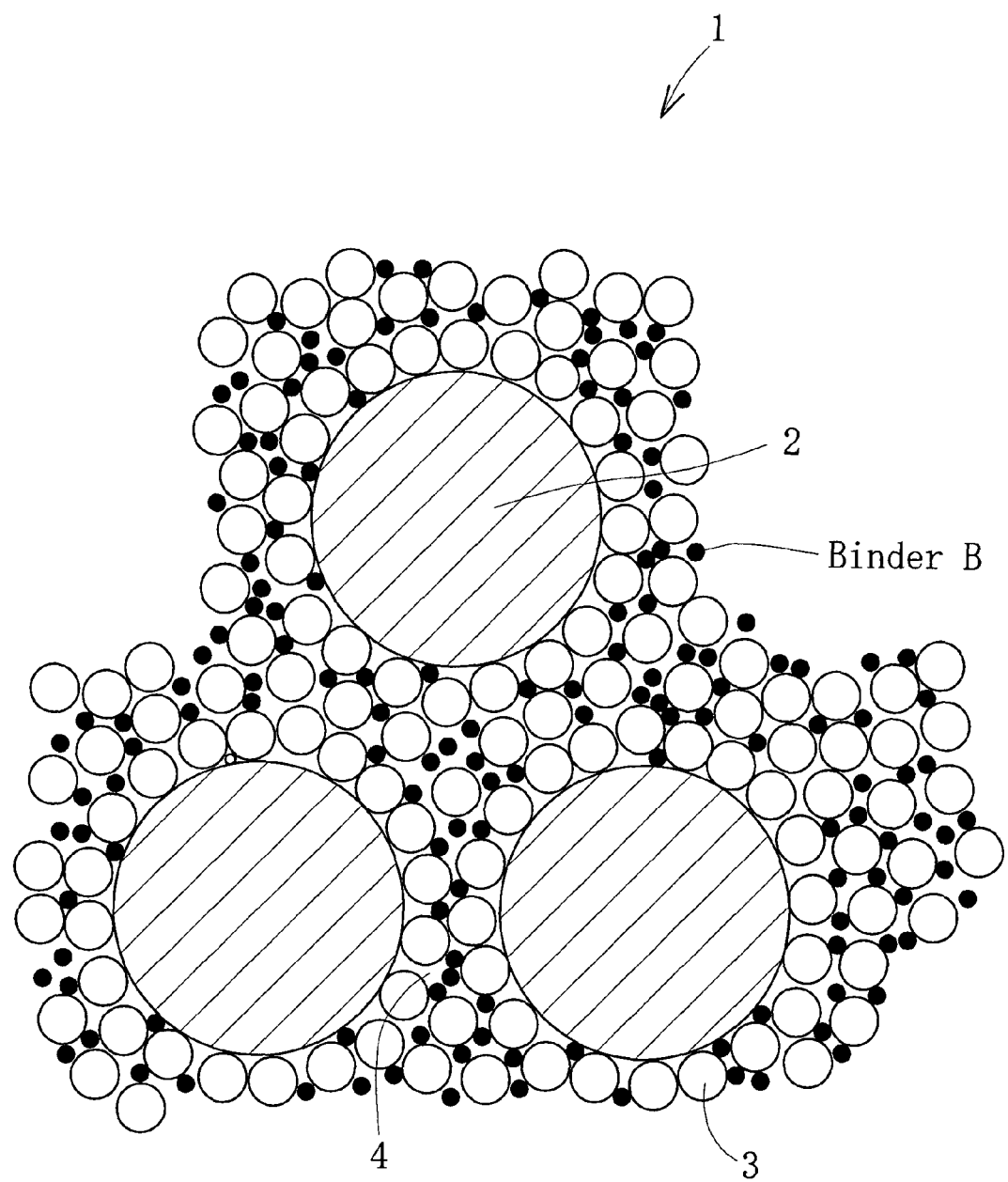
FIG. 2 is a conceptual diagram showing a cross sectional structure of the formed body after a first degreasing step.

When the degreasing temperature reaches and exceeds the draining-start temperature (240° C.) of the pore formation material, the binder A drains, the pore formation material 2 begins to drain, and further, the binder B begins to drain, i.e. a second degreasing step takes place. In the present example, the pore formation material 2 begins draining at a temperature not lower than 240° C. while the binder B begins draining at a temperature not lower than 255° C. In other words, the three components drain simultaneously in the second degreasing step. FIG. 2 shows a state where the binder A has drained completely. For easier understanding, FIG. 2 illustrates as if no part of the pore formation material 2 or binder B has been drained; however, part of them has already been draining. As is clear from FIG. 2, draining of the binder A leaves continuous gap spaces 4 among the metal particles. Therefore, it is possible to drain the pore formation material 2 smoothly via these gap spaces. On the other hand, since the binder B is present and provides bonding between the metal particles, a sufficient level of strength is maintained while the pore formation material drains. Further, as the draining speed of the pore formation material 2 increases, so does the amount of the binder draining, providing sufficient gap space for the pore formation material to drain through. Therefore, it is possible to let the pore formation material drain while keeping the shape of the pores 5.

Figure 3:
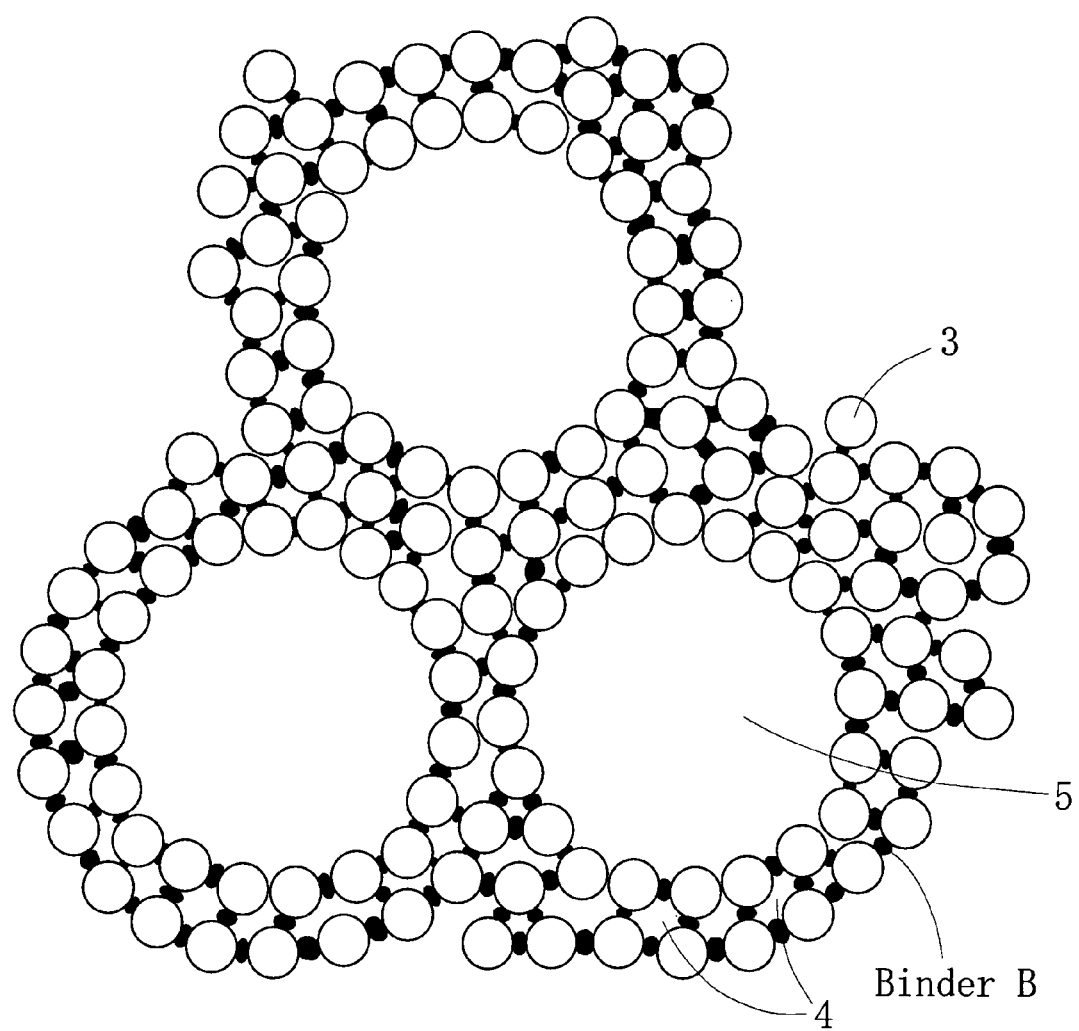
FIG. 3 is a conceptual diagram showing a cross sectional structure of the formed body after a second degreasing step.

As the degreasing temperature reaches 400° C., the binder A and the pore formation material 2 have completely drained as shown in FIG. 3, leaving the pores 5. After the pore formation material 2 has drained, the binder B is slightly softer, and provides bridging between the metal particles 3 thereby providing increased shape retentionability. Further, the binder B prevents the metal particles from dropping into the pores 5 which are left by the pore formation material. The metal particles do not change their relative positions, providing an intermediate degreased body of highly accurate shape and dimensions.

Figure 4:
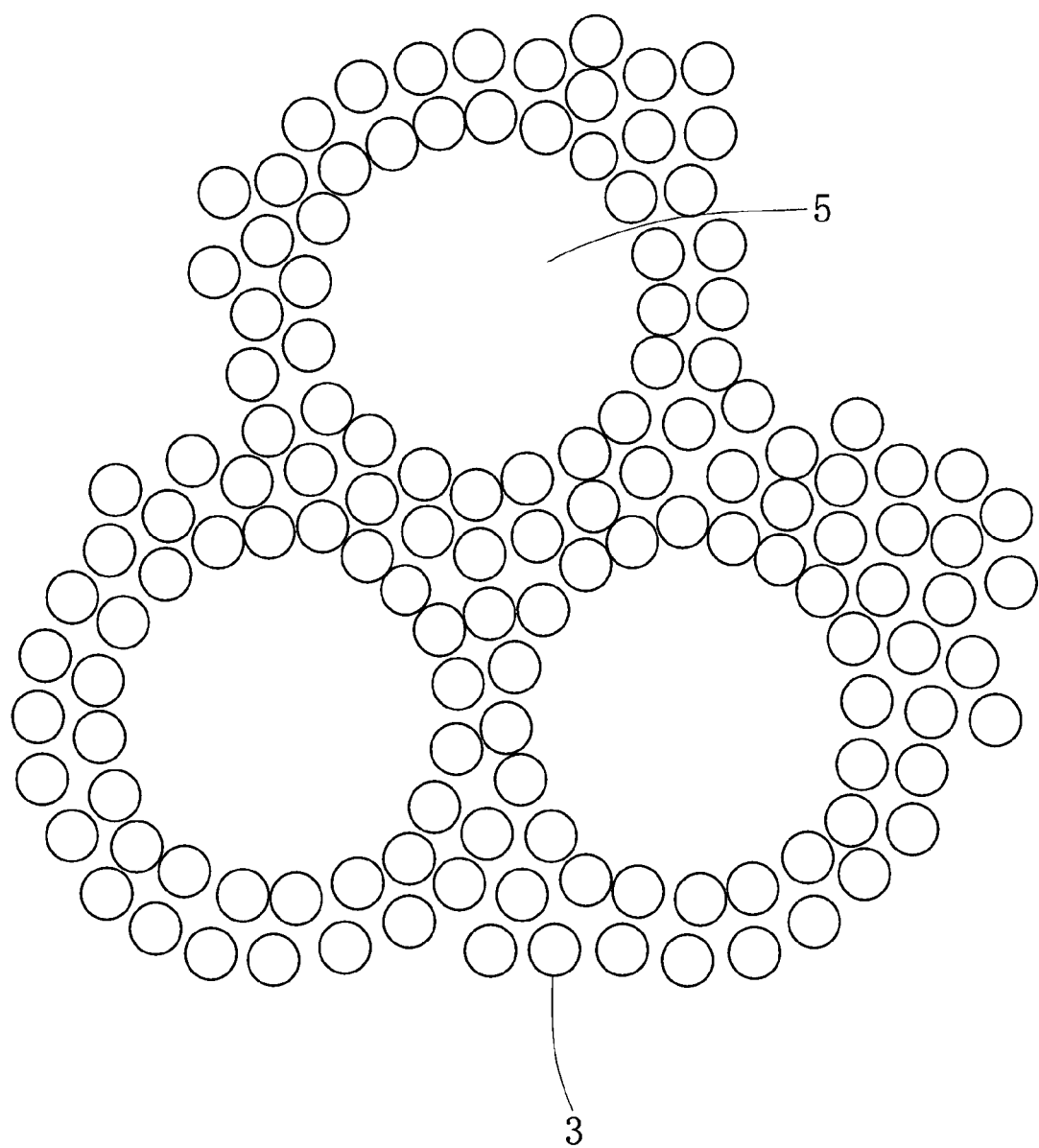
FIG. 4 is a conceptual diagram showing a cross sectional structure of the formed body after a third degreasing step.

After the pore formation material is drained, the temperature is further increased to perform a third degreasing step (S105), to remove the binder B. The third degreasing step leaves a degreased body as shown in FIG. 4, formed by the metal particle 3. For easier understanding, FIG. 4 illustrates as if the particles are separated from each other; however, there is only little shrinkage in the degreased body because the particles distribute in a three-dimensional manner in up-and-down directions in the drawing.

Figure 5:
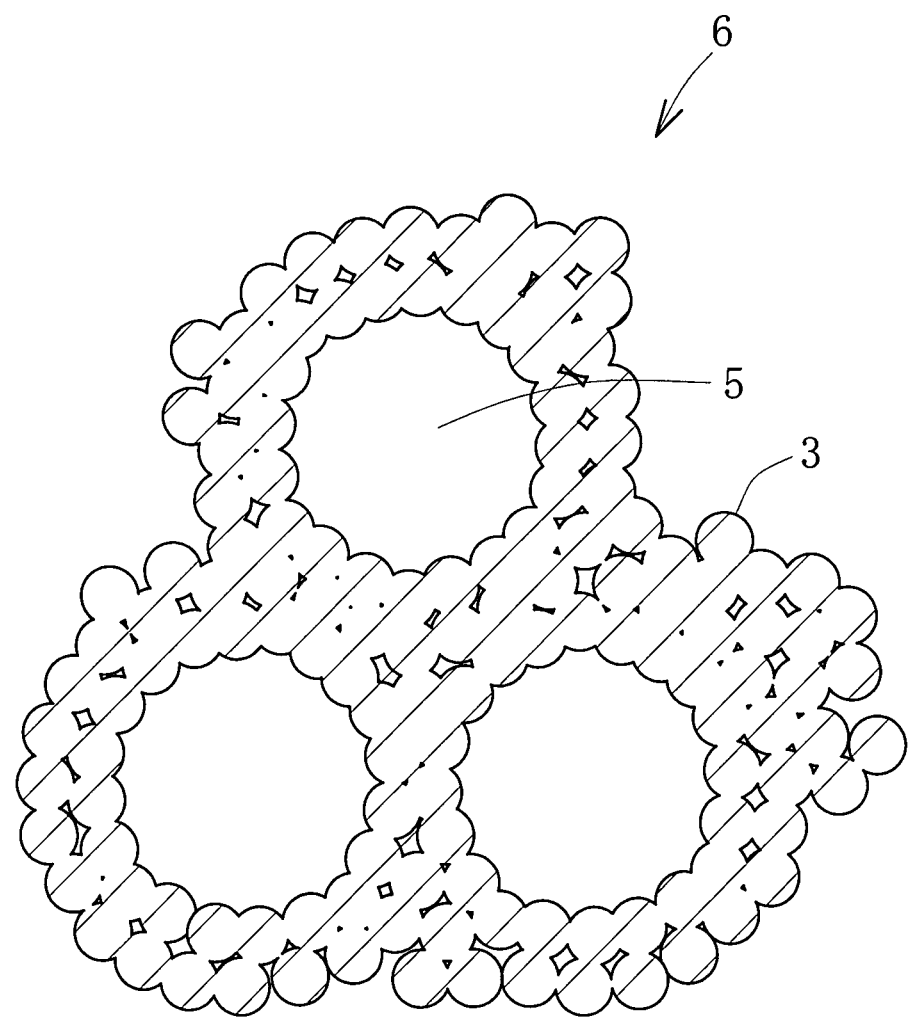
FIG. 5 is a conceptual diagram showing a cross sectional structure of a sintered body.

Next, the temperature of the furnace is increased beyond the sintering temperature of the metal, to perform a sintering step thereby sintering the metal particles. The sintering step causes metal particles to be bonded with adjacent metal particles, shrinks gap spaces between the adjacent particles, and yields a sintered body 6 as shown in FIG. 5. The sintered body is shrunken from the formed body approximately by the amount of the binder mixed thereto.

Figure 7:
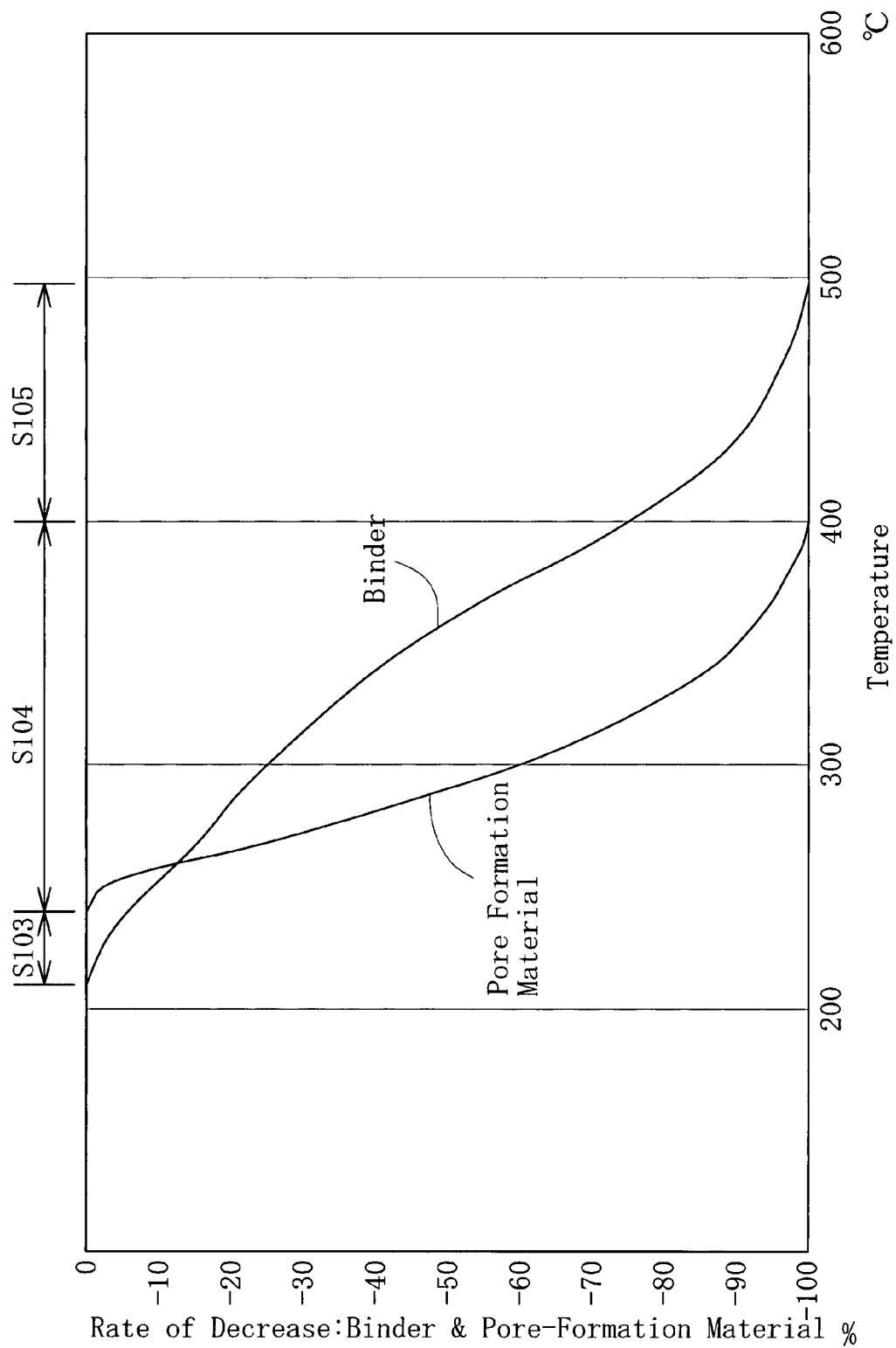
FIG. 7 is a graph of a degreasing step, showing how a pore formation material and a binder decrease.

FIG. 7 shows how the pore formation material 2 and the binder (the entire body of A and B) decrease in the present example. The graph has its vertical axis representing the rate of decrease, and the horizontal axis representing the degreasing temperature. As shown in the figure, first, part of the binder A begins to drain in the present example. This provides a channel in the formed body, for the pore formation material 2 to drain through. Next, the pore formation material 2 begins to drain: The rate of decrease in the pore formation material 2 exceeds that of the binder at a certain temperature, and this situation continues until the pore formation material drains completely, i.e. the pore formation material 2 completes draining before the binder does. In other words, the degreasing step is performed while securing drainage paths for the pore formation material 2 and while providing reinforcement by the binder, with part of the binder remaining un-drained even at a point when the pore formation material has completely drained. This enables to allow the degreasing step to proceed, with increased shape retentionability of the formed body.

By retaining the binder B when draining the pore formation material, walls which define individual pores remain intact. Thus, it is possible to form accurate porous bodies based on the rate of addition of the pore formation material.

Further, in the present example, the binder B contains two binder components each having a different draining temperature from the other. This prevents premature draining of the remaining binder which remains after the pore formation material 2 has drained. Therefore, it is possible to prevent the formed body from being subjected to excessive stresses in the process when the binder drains. As a result, even after the pore formation material 2 has drained, the method provides good shape retentionability, enabling to prevent the formed body from deforming.

TABLE 2

| Comparative Example | | | | | |
|---|---|---|---|---|---|
| Composition | Component | Particle Size | Mixing Ratio to All (Vol %) | Drain Starting Temperature (° C.) | Drain Temperature |
| Pore Formation Material | PMMA | 50 μm | 60 | 240 | 400 |
| Metal Powder | SUS316L | 10 μm | 20 | | |
| Binder A | Wax | | 10 | 210 | 340 |
| Binder B | PS (polystyrene) | | 10 | 280 | 360 |

Table 2 shows a combination ratio in a comparative example. In the comparative example, the binder B which drains at a temperature higher than that of the pore formation material 2 is replaced by a binder C (polystyrene) which drains at a temperature lower than that of the pore formation material 2. All of the others in the combination ratio are identical with those in the embodiment example 1, so no more description will be given here. Further, there is no difference from the embodiment example in the degreasing step or the sintering step; however, it should be noted that the third degreasing step is not performed in the comparative example since the binder B is not mixed thereto.

Measurements were made to sintered bodies which were made in the embodiment example 1 and the comparative example. In the embodiment example, the porous body had an approximately 60% porosity, matching to the combination ratio of the pore formation material 2. In the comparative example on the other hand, the porous body had an approximately 40% porosity despite the fact that the same combination ratio of the pore formation material was used. Further, microscopic observation of the structure of the sintered body according to the embodiment example 1 revealed that the example 1 had substantially uniform, spherical pores. In the comparative example on the other hand, pore shapes were irregularly deformed and the sizes were smaller. From these observations, it became clear that a porous sintered body which has a high level of accuracy can be formed by using the binder B thereby retaining the shape which is formed with the metal particles, during the time when draining the pore formation material.

Figure 6:
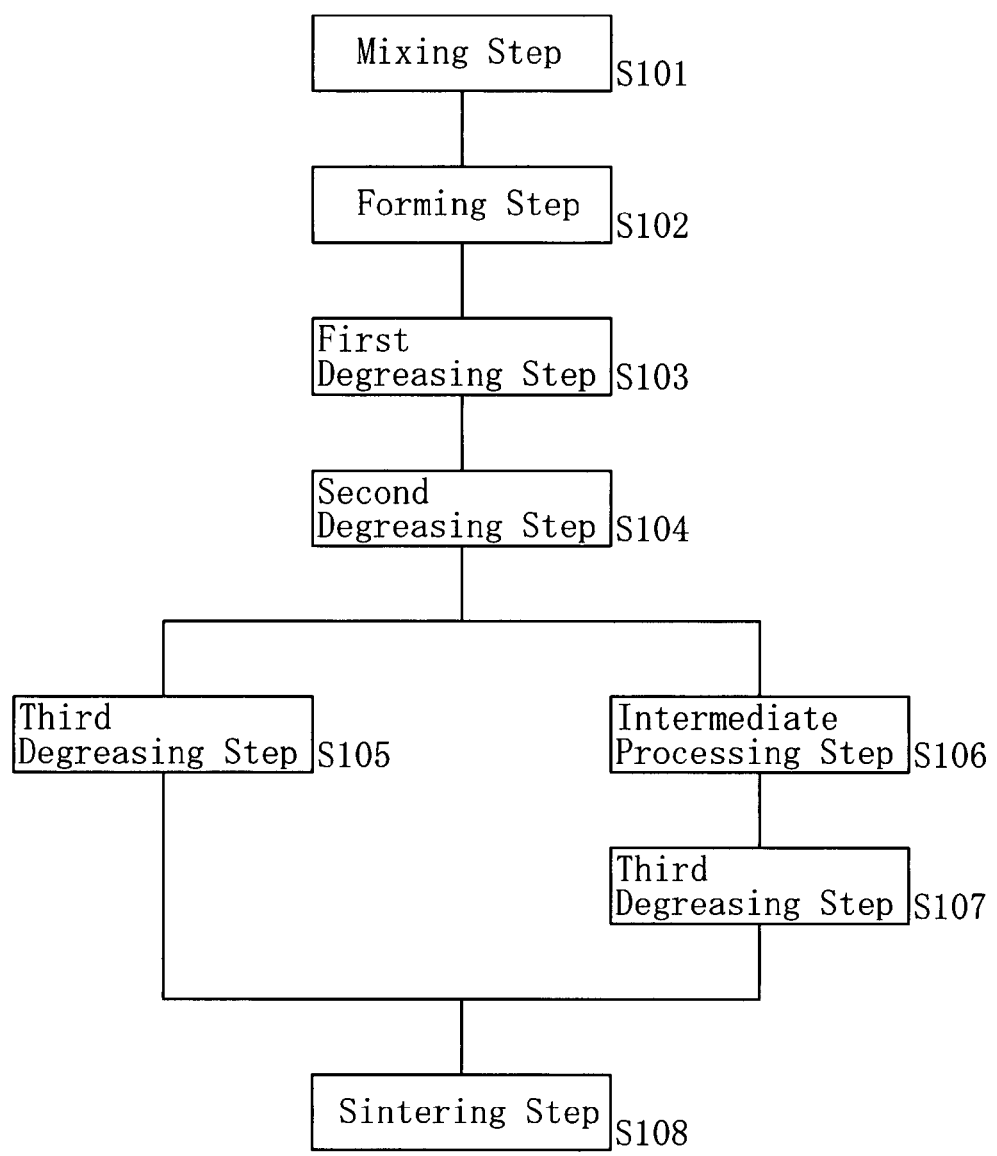
FIG. 6 is a flowchart showing steps of the present invention.

As shown in FIG. 6, the second degreasing step S104 may be followed by an interim work step S106. Since it is possible, according to the present embodiment, to retain the binder after the pore formation material has drained, a sufficient level of strength is retained in the porous formed body, and therefore, a variety of works can be performed to the sintered body even after the body became porous.

The interim work step may include e.g. machining like in convention. Further, it is now possible to fill the pores and continuous pore spaces in the formed body with a variety of functional substances.

The second degreasing step shrinks the formed body very little, so the pores have a large size. Thus, it is now possible to load the intermediate body with functional substances which have not been possible to load according to conventional methods. There is no specific limitation to the method for the loading; for example, a high level of porosity allows use of fluid as a way to fill the spaces with functional substance, while it is also possible to use a mechanical method of filling a functional substance only in the surface.

A substance which acts as a catalyst may be filled in the pores before sintering is performed in the sintering step. According to this process, the catalytic substance is fixed in inner walls of the pores, so it is now possible to fix expensive substances such as platinum inside of the pores.

Figure 8:
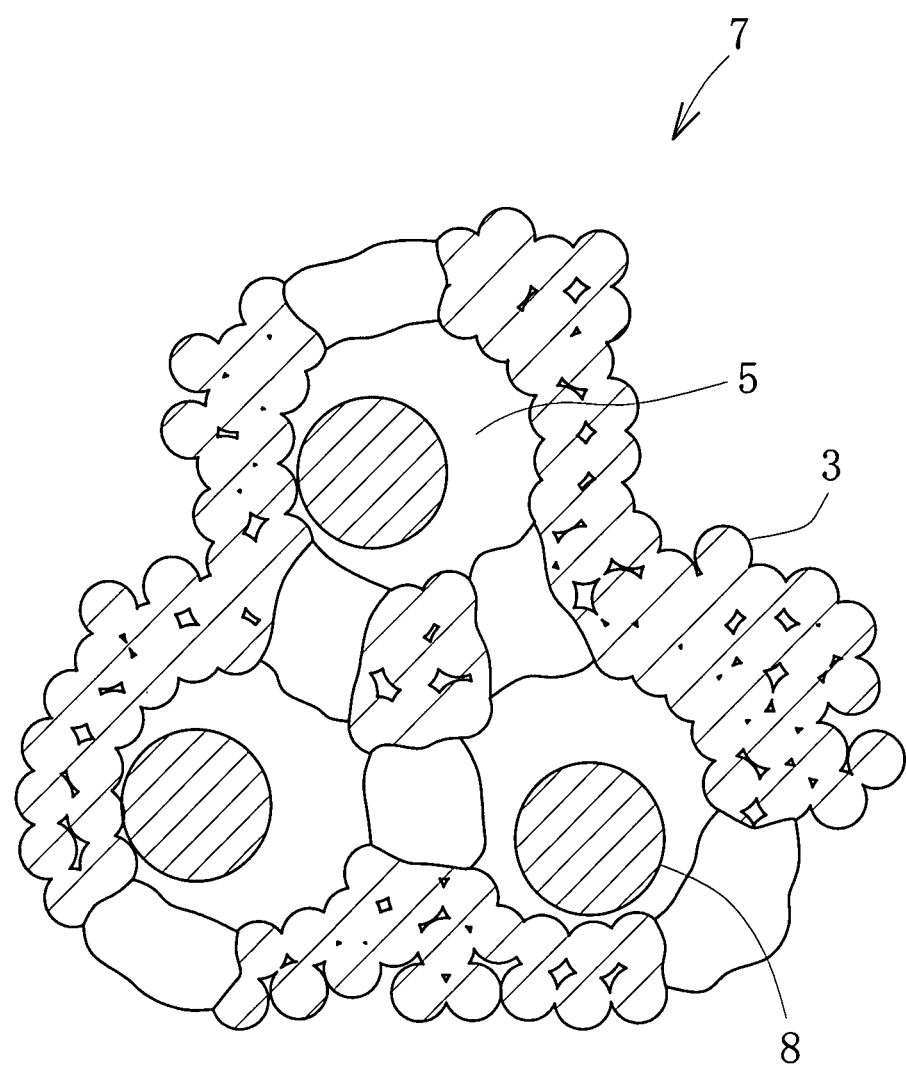
FIG. 8 is a conceptual diagram showing a cross sectional structure of a sintered body according to a second embodiment of the present invention.

Further, as shown in FIG. 8, it also becomes possible to have these continuous pores 5 hold particles 8 which are not sintered together with the porous sintered body, through an additional step performed later.

In the present embodiment, a porous formed body containing pores which communicate with each other are formed, then the particles 8 are filled, and thereafter, the third degreasing step S107 and the sintering step S108 are performed. Since the sintering step shrinks the pores 5, it is also possible to make the particles movable but inescapable from the pores.

The fillers may be selected from metal oxides such as titanium oxide and functional ceramics such as apatite.

The invention claimed is:

1. A method of making a porous sintered body, comprising:
    a pellet making step of making a compound pellet by heating and mixing a sintering compound containing a binder, a sinterable powder material and a pore formation material at a temperature causing the binder to melt but not causing the pore formation material to soften;
    a thermal formation step of forming the pellet made in the pellet making step into a predetermined shape at a temperature causing the binder to melt but not causing the pore formation material to deform;
    a degreasing step of removing the binder from a formed body obtained from the thermal formation step, at a temperature causing the pore formation material to drain and not causing a part of the binder to drain; and
    a sintering step of sintering a degreased body after the degreasing step,
    wherein the binder contains a component which melts at a temperature attained in the pellet making step and the thermal formation step and drains at a temperature higher than a temperature at which the pore formation material drains,
    the porous sintered body is formed during the sintering step, and
    a rate of porosity of the porous sintered body is 50-80%, correlating to a mixing rate of of the pore formation material in the sintering compound.

2. The method according to claim 1, wherein the binder comprises:
    a low-temperature draining component which begins to drain at a temperature lower than a draining temperature of the pore formation material, and drains at a degreasing temperature that is lower than the draining temperature of the pore formation material; and
    a high-temperature draining component which begins to drain at a temperature higher than a drain-starting temperature of the pore formation material, and drains at a degreasing temperature that is higher than the draining temperature of the pore formation material,
    the degreasing step comprises:
    a first degreasing step where the low-temperature draining component is allowed to begin draining and before the pore formation material is allowed to begin draining;
    a second degreasing step where the pore formation material is allowed to drain completely; and
    a third degreasing step where the high-temperature draining component is allowed to drain completely.

3. The method of making a porous sintered body according to claim 2, wherein the pore formation material is allowed to drain through gaps formed by drainage of the low-temperature draining component or gaps formed by drainage of part of the high-temperature draining component, in the second degreasing step.

4. The method of making a porous sintered body according to claim 2, wherein the high-temperature draining component comprises at least two binder components each having a draining temperature differing from the other,
    the binder components having different draining temperatures being drained sequentially in the third degreasing step.

5. The method of making a porous sintered body according to claim 2, further comprising an interim work step of subjecting an intermediary degreased body which has undergone the second degreasing step to intermediate processing.

6. The method of making a porous sintered body having continuous pores according to claim 2, further comprising
    an additional-material filling step of filling a predetermined additional-material to part or all of the pores in an intermediary degreased body which has undergone the second degreasing step.

7. The method of making a porous sintered body according to claim 6, wherein the third degreasing step and the sintering step are performed after the additional-material filling step, the additional-material being sintered integrally with the sintering compound in an inner surface of the pores.

8. The method of making a porous sintered body according to claim 6, wherein the third degreasing step and the sintering step are performed after the additional-material filling step, the additional material being held movably in the pores.

9. The method of making a porous sintered body according to claim 1, wherein the binder component is drained by a 0.1 volume percent through 5.0 volume percent before the pore formation material begins draining.

10. The method of making a porous sintered body according to claim 1, wherein the binder component remains undrained by 5 volume percent through 40 volume percent upon complete drainage of the pore formation material.

11. The method of making a porous sintered body according to claim 1, wherein the pore formation material is mixed at a ratio of 50 through 80 volume percent of the sintering compound.

12. The method of making a porous sintered body according to claim 1, wherein the formation step employs an injection molding process.

13. The method according to claim 1, wherein the rate of porosity of the porous sintered body is approximately the same before and after the sintering step.

* * * * *